(12) United States Patent
Vargantwar et al.

(10) Patent No.: US 8,107,961 B1
(45) Date of Patent: Jan. 31, 2012

(54) METHOD AND SYSTEM FOR OPTIMIZING FREQUENCY ALLOCATION DURING HANDOFF

(75) Inventors: Sachin R. Vargantwar, Overland Park, KS (US); Siddharth S. Oroskar, Overland Park, KS (US); Manoj Shetty, Overland Park, KS (US); Ashvini G. Canjeevaram, Burlington, MA (US); Deveshkumar Rai, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 804 days.

(21) Appl. No.: 12/165,748

(22) Filed: Jul. 1, 2008

(51) Int. Cl.
*H04W 36/00* (2009.01)
*H04W 72/00* (2009.01)
*H04W 4/00* (2009.01)

(52) U.S. Cl. ..................... 455/436; 455/451; 455/452.2; 370/331

(58) Field of Classification Search .................. 455/436, 455/452.2, 450, 451, 452.1, 453; 370/331
See application file for complete search history.

(56) References Cited

U.S. PATENT DOCUMENTS

| | | | | |
|---|---|---|---|---|
| 5,862,485 A * | 1/1999 | Linneweh et al. | ............ | 455/450 |
| 6,047,006 A * | 4/2000 | Brakefield et al. | ............ | 370/524 |
| 6,229,796 B1 * | 5/2001 | Dent | ............ | 370/335 |
| 6,236,855 B1 * | 5/2001 | Austin | ............ | 455/423 |
| 6,388,998 B1 * | 5/2002 | Kasturia | ............ | 370/320 |
| 6,466,557 B1 * | 10/2002 | Doi | ............ | 370/332 |
| 6,996,056 B2 | 2/2006 | Chheda et al. | | |
| 7,536,192 B2 * | 5/2009 | O'Neill | ............ | 455/509 |
| 2002/0082021 A1 * | 6/2002 | Chen et al. | ............ | 455/450 |
| 2003/0064730 A1 * | 4/2003 | Chen et al. | ............ | 455/453 |
| 2004/0023646 A1 * | 2/2004 | Inami et al. | ............ | 455/418 |
| 2004/0032828 A1 * | 2/2004 | Satt et al. | ............ | 370/230 |
| 2004/0033806 A1 * | 2/2004 | Daniel et al. | ............ | 455/450 |
| 2005/0085235 A1 * | 4/2005 | Park et al. | ............ | 455/450 |
| 2005/0124343 A1 * | 6/2005 | Kubo | ............ | 455/436 |
| 2005/0197132 A1 * | 9/2005 | Lee et al. | ............ | 455/450 |
| 2005/0208948 A1 * | 9/2005 | Hori et al. | ............ | 455/452.1 |
| 2007/0083868 A1 * | 4/2007 | Sankaranarayan et al. | ... | 718/104 |
| 2007/0217390 A1 * | 9/2007 | Laroia et al. | ............ | 370/350 |
| 2008/0039110 A1 * | 2/2008 | Kim et al. | ............ | 455/452.1 |
| 2008/0176570 A1 * | 7/2008 | Voyer et al. | ............ | 455/436 |
| 2008/0192638 A1 * | 8/2008 | Massiera et al. | ............ | 370/237 |
| 2009/0019165 A1 * | 1/2009 | Li et al. | ............ | 709/227 |
| 2010/0202420 A1 * | 8/2010 | Jersenius et al. | ............ | 370/337 |
| 2010/0255849 A1 * | 10/2010 | Ore | ............ | 455/450 |

\* cited by examiner

*Primary Examiner* — Christopher M Brandt (57) ABSTRACT

A method and system is disclosed for optimizing handoff of access terminals. In particular, when (i) a given access terminal must switch from a first channel band in a first coverage area to a second channel band in order to hand off to a second coverage area, and (ii) there are no available identifiers to assign to the given access terminal to facilitate making the switch from the first channel band to the second channel band in the first coverage area prior to handing off to the second coverage area, an appropriate identifier is advantageously reassigned from another access terminal to the given access terminal. With the reassigned identifier, the given access terminal may then switch to the second channel band in the first coverage area prior to handing off to the second coverage area.

22 Claims, 6 Drawing Sheets

METHOD AND SYSTEM FOR OPTIMIZING FREQUENCY ALLOCATION DURING HANDOFF

BACKGROUND

In a typical cellular radio communication system (wireless communication system), an area is divided geographically into a number of cell sites, each defined by a radio frequency (RF) radiation pattern from a respective base transceiver station (BTS) antenna. The base station antennae in the cells are in turn coupled to a base station controller (BSC), which is then coupled to a telecommunications switch or gateway, such as a mobile switching center (MSC) and/or a packet data serving node (PDSN) for instance. The switch or gateway may then be coupled with a transport network, such as the PSTN or a packet-switched network (e.g., the Internet).

When an access terminal (such as a cellular telephone, pager, or appropriately equipped portable computer, for instance) is positioned in a cell, the access terminal (also referred to herein by "AT") communicates via an RF air interface with the BTS antenna of the cell. Consequently, a communication path is established between the AT and the transport network, via the air interface, the BTS, the BSC and the switch or gateway.

As the demand for wireless communications has grown, the volume of call traffic in most cell sites has correspondingly increased. To help manage the call traffic, most cells in a wireless network are usually further divided geographically into a number of sectors, each defined respectively by radiation patterns from directional antenna components of the respective BTS, or by respective BTS antennae. These sectors can be referred to as "physical sectors," since they are physical areas of a cell site. Therefore, at any given instant, an access terminal in a wireless network will typically be positioned in a given physical sector and will be able to communicate with the transport network via the BTS serving that physical sector.

As an access terminal moves between wireless coverage areas of a wireless communication system, such as between cells or sectors, or when network conditions change or for other reasons, the AT may "hand off" from operating in one coverage area to operating in another coverage area. In a usual case, this handoff process is triggered by the access terminal monitoring the signal strength of various nearby available coverage areas, and the access terminal or the BSC (or other controlling network entity) determining when one or more threshold criteria are met. For instance, the AT may continuously monitor signal strength from various available sectors and notify the BSC when a given sector has a signal strength that is sufficiently higher than the sector in which the AT is currently operating. The BSC may then direct the AT to hand off to that other sector. By convention, an AT is said to handoff from a "source" cell or sector (or other coverage area) to a "target" cell or sector.

In some wireless communication systems or markets, a wireless service provider may implement more than one type of air interface protocol. For example, a carrier may support one or another version of CDMA, such as EIA/TIA/IS-2000 Rel. 0, A (hereafter "IS-2000") for both circuit-cellular voice and data traffic, as well as a more exclusively packet-data-oriented protocol such as EIA/TIA/IS-856 Rel. 0, A, or other version thereof (hereafter "IS-856"). Access terminals operating in such systems may be capable of communication with either or both protocols, and may further be capable of handing off between them, in addition to being able to hand off between various configurations of coverage areas.

SUMMARY

Under IS-2000, IS-856, and other CDMA or CDMA-related protocols, adjacent coverage areas (e.g., cells or sectors) may employ different carrier frequencies. For example, all coverage areas of a wireless communication system may employ a common carrier frequency, while certain coverage areas may employ one or more additional carrier frequencies, depending on volume and capacity needs, for example. Consequently, there may be locations where a first coverage area supports both the common and an additional carrier frequency, while an adjacent, second coverage area supports only the common carrier frequency.

When a given access terminal operating on the additional carrier frequency in the first coverage area needs to handoff to the second coverage area, the given access terminal must also switch to the common carrier frequency. For reasons of improved reliability (among others), it is preferable for the given access terminal to make this switch prior to the handoff—i.e., while still operating in the first coverage area—rather than as part of the handoff. In order to do so, an identifier (e.g., a "Walsh code" or "MAC ID") for use in communication on the common carrier frequency must be available in the first coverage area for assignment to the given access terminal. It may be the case, however, that all such identifiers have been assigned to other access terminals, and therefore the given access terminal cannot switch to the common carrier frequency prior to handing off to the second coverage area.

Accordingly, embodiments of the present invention provide a method and system for optimizing handoff of access terminals. More particularly, a method and system is disclosed for borrowing an appropriate identifier from one access terminal and reassigning it to another access terminal in order to facilitate that handoff of that other access terminal.

Hence, in one respect, various embodiments of the present invention provide, in a wireless communication system that includes a plurality of coverage areas, and in which handoffs of access terminals between coverage areas are facilitated, at least in part, by identifiers assigned to the access terminals for communicating over air interfaces in the coverage areas, a method comprising: determining that a handoff of a first access terminal from a first coverage area to a second coverage area is necessary; responsively determining that none of a plurality of identifiers is available for facilitating the handoff; determining that a second access terminal has been assigned a particular identifier from among the plurality of identifiers; reallocating the particular identifier from the second access terminal to the first access terminal, thereby reassigning the particular identifier to the first access terminal; and performing the handoff of the first access terminal from the first coverage area to the second coverage area using the particular identifier to facilitate the handoff.

In another respect, various embodiments of the present invention provide, in a wireless communication system that operates according to a CDMA family of protocols, includes a plurality of coverage areas, and in which handoffs of access terminals between coverage areas are facilitated, at least in part, by identifiers assigned to the access terminals for communicating over air interfaces in the coverage areas, a method comprising: determining that a first access terminal using a first identifier for communicating on a first carrier frequency in a first coverage area needs to be handed off to a second coverage area that supports communications on at least a common carrier frequency; reassigning a particular identifier from a second access terminal to the first access terminal, the particular identifier being for use in communicating on the common carrier frequency in the first coverage area; handing down the first access terminal from the first carrier frequency in the first coverage area to the common carrier frequency in the first coverage area; on the common carrier frequency, performing a soft handoff of the first access terminal from the first coverage area to the second coverage area; deallocating the particular identifier from the first access terminal upon completion of the soft handoff; and assigning to the second access terminal one identifier selected from the group consisting of the deallocated particular identifier and a second identifier for communicating on the common carrier frequency in the first coverage area.

In still another respect, various embodiments of the present invention provide, in a wireless communication system that operates according to a CDMA family of protocols, includes a plurality of coverage areas, and in which handoffs of access terminals between coverage areas are facilitated, at least in part, by identifiers assigned to the access terminals for communicating over air interfaces in the coverage areas, an improvement comprising: means for determining that a first access terminal using a first identifier for communicating on a first carrier frequency in a first coverage area needs to be handed off to a second coverage area that supports communications on at least a common carrier frequency; means for reassigning a particular identifier from a second access terminal to the first access terminal, wherein the particular identifier is for use in communicating on the common carrier frequency in the first coverage area; means for handing down the first access terminal from the first carrier frequency in the first coverage area to the common carrier frequency in the first coverage area; means for performing a soft handoff on the common carrier frequency of the first access terminal from the first coverage area to the second coverage area; means for deallocating the particular identifier from the first access terminal upon completion of the soft handoff; and means assigning to the second access terminal one of the deallocated particular identifier and a second identifier for communicating on the common carrier frequency in the first coverage area.

These as well as other aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrate the invention by way of example only and, as such, that numerous variations are possible. For instance, structural elements and process steps can be rearranged, combined, distributed, eliminated, or otherwise changed, while remaining within the scope of the invention as claimed.

BRIEF DESCRIPTION OF THE DRAWINGS

FIG. 4(a-c) illustrates in three phases an example embodiment of optimized handoff of an access terminal across a frequency.

DETAILED DESCRIPTION

The present invention will be described by way of example with reference to Code Division Multiple Access ("CDMA") communications in general, and to IS-2000 and IS-856 communications in particular. As described below, IS-2000 applies to both circuit-cellular and packet-data communications, and is referred to herein as "conventional" CDMA communications. IS-856 applies more exclusively to packet-data communications (including, e.g., real-time voice and data applications), and is referred to herein as "high rate" packet-data communications. Under IS-2000, packet-data communications are conventionally referred to as "1X-RTT" communications, also abbreviated as just "1X." Packet-data communications under IS-856 are conventionally referred to as "EV-DO" communications, also abbreviated as just "DO." It should be understood that the present invention can apply to other wireless voice and data protocols including, without limitation, IS-95 and GSM, which, together with IS-2000 and IS-856 are considered herein, individually or in any combination, to comprise a CDMA family of protocols.

Figure 1:
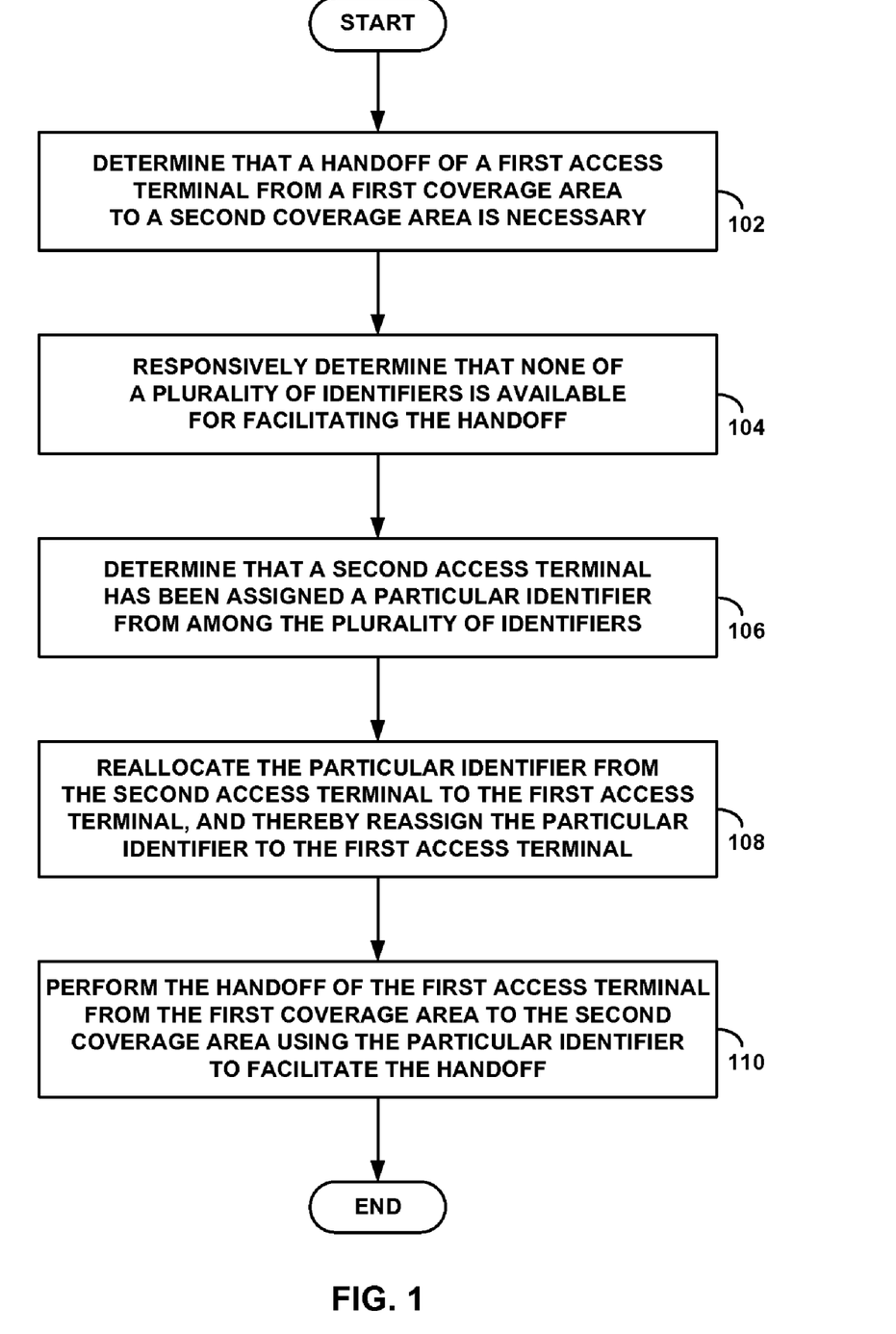
FIG. 1 is a flowchart depicting an example embodiment of optimized handoff of an access terminal.

FIG. 1 is a flowchart depicting an example embodiment of optimized handoff of an access terminal. By way of example, the steps of the flowchart could be implemented in a wireless communication system that operates according to a CDMA family of protocols. At step 102, a determination is made that a handoff of a first access terminal from a first coverage are to a second coverage area is necessary. For example, a comparison of signal strengths from the two coverage areas may indicate that the first access terminal is moving from the first to the second coverage area, and therefore needs to handoff from the first (source) to the second (target) coverage area. The determination could be made by the first access terminal's serving base station (or BSC), for instance. Additionally, the first and second coverage areas could be cells or sectors.

At step 104, responsive to determining that the handoff is necessary, a determination may be made that none of a plurality of identifiers is available for facilitating the handoff. For instance, the first access terminal could have been assigned a first identifier for communicating on a first channel band in the first coverage area. Further, the handoff may require that the first access terminal switch from the first channel band to a second channel band. In order make the switch prior to the handoff—that is, while still operating in the first coverage area—the first access terminal may need to acquire another identifier for communicating on the second channel band in the first coverage area. This other identifier will thus facilitate the handoff. It may be the case, however, that out of a plurality of other such identifiers in the first coverage area, none is currently available for assignment to the first access terminal.

By way of example, the identifiers could be "Walsh codes" used in a wireless communication system operating under IS-2000, the first channel band could be a first carrier frequency, and the second channel band could be a second, common carrier frequency. More specifically the first identifier could be a Walsh code assigned to the first access terminal for communication on a forward channel on the first carrier frequency in the first coverage area, and the plurality of other identifiers could then be a plurality of other Walsh codes for use in communications on the second, common carrier frequency in the first coverage area. Further, both the first carrier frequency and the second, common carrier frequency could be employed in the first coverage area, while the only the second, common carrier frequency is employed in the second coverage area. Hence the need for the first access terminal to switch from the first carrier frequency to the second, common carrier frequency. The lack of availability of any of the plurality of other Walsh codes for assignment to the first access terminal could be a consequence of each of other Walsh codes already being assigned to a plurality of other access terminals, for example.

As another example, the identifiers could be "MAC IDs" used in the same or a different wireless communication system operating under IS-856. The first and second channel bands could again be a first carrier frequency and a second, common carrier frequency. Other aspects of this example are largely the same as those described for the IS-2000 in the preceding paragraph, except that the identifiers are MAC IDs instead of Walsh codes. Note that the Walsh codes and MAC IDs, as well as IS-2000 and IS-856, are discussed in more detail below.

At step 106, a determination is made that a second access terminal has been assigned a particular identifier from among the plurality of other identifiers. For example, the second access terminal may have been assigned a particular Walsh code from among the plurality of Walsh codes for use on the second, common carrier frequency in the first coverage area. The second access terminal may be one that is engaging packet data communication under IS-2000 in the first coverage area. Alternatively, the second access terminal could have been assigned a particular MAC ID from among the plurality of MAC IDs for use on the second, common carrier frequency in the first coverage area. In this case, the second access terminal may be one that is engaging packet data communication under IS-856 in the first coverage area, and receiving a given level of service, such as best effort service, that is considered tolerant to some degree of delay or interruption.

The particular identifier is reallocated (or reassigned) from the second access terminal to the first access terminal at step 108. For instance, the serving base station in the first coverage are could advantageously carry out this action. In doing, communication from the base station to the second access terminal would be suspended. Again, the particular identifier could be a Walsh code in a system operating under IS-2000 or a MAC ID in a system operating under IS-856. Moreover, a single system could implement both IS-2000 and IS-856 (i.e., a so-called hybrid system).

Finally, at step 110, a handoff of the first access terminal from the first coverage area to the second coverage area is carried out using the particular identifier to facilitate the handoff. In view of the explanation of step 104, once the particular identifier has been reassigned from the second to the first access terminal (step 108), the first access terminal may be switched from the first to the second channel band in the first coverage area prior to the handoff. Then the handoff of the first access terminal can advantageously proceed from the second channel band in the first coverage area to the same second channel band in the second coverage area. Once the handoff is complete, the first access terminal may then relinquish the particular identifier, thereby making it available again in the first coverage area. In particular, the second access terminal may again be assigned the particular identifier (or another that may have become available in the interim) and thereafter resume communication on the second channel band in the first coverage area.

Continuing with the IS-2000 example above, the particular identifier could be a Walsh code that, once reassigned to the first access terminal, facilitates a "hand-down" of the first access terminal from the first carrier frequency to the second, common carrier frequency in the first coverage area. The handoff of the first access terminal from the first to the second coverage then takes place on the second, common carrier frequency, which is employed in both coverage areas. Under IS-2000, such a handoff is referred to a soft handoff. Alternatively, under IS-856, the particular identifier could be a MAC ID that, once reassigned to the first access terminal, also facilitates a "hand-down" of the first access terminal from the first carrier frequency to the second, common carrier frequency in the first coverage area. Again, the handoff takes place on the second, common carrier frequency. Under IS-856, such a handoff is referred to a virtual soft handoff.

It will be appreciated that the steps of FIG. 1 are illustrated by way of example, and that additional and/or alternative steps or alternative ordering of steps could be carried in order to achieve optimized handoff. Additionally, the logical ordering of the steps does not necessarily correspond to a strict temporal ordering. For instance, some steps could be carried out concurrently.

Figure 2:
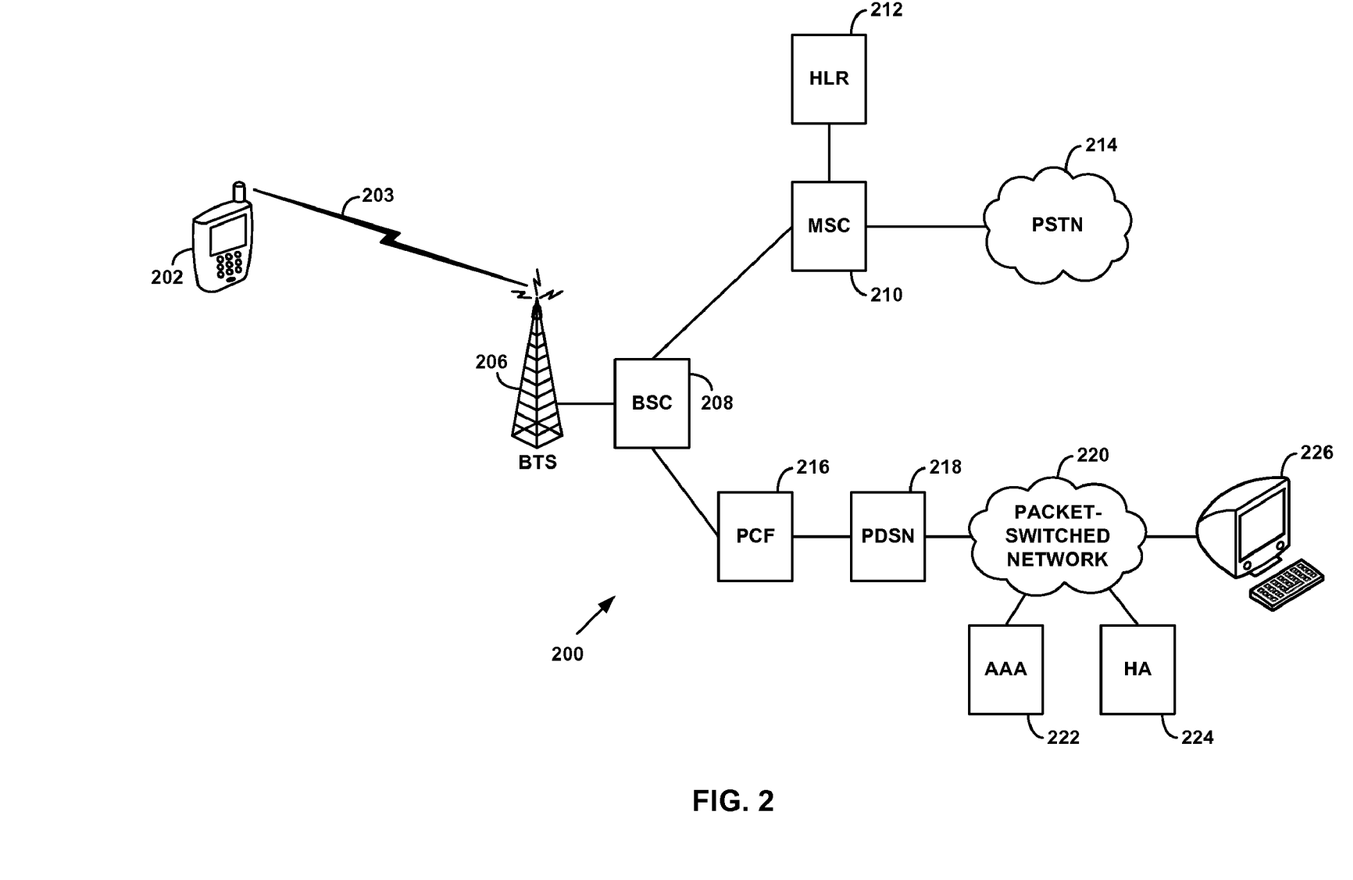
FIG. 2 is a simplified block diagram of a wireless communication system in which an example embodiment of optimized handoff could be carried out.

FIG. 2 shows a simplified block diagram of a wireless communication system 200 in which an exemplary embodiment of optimized handoff can be employed. Access terminal AT 202 communicates over an air interface 203 with a BTS 206, which is then coupled or integrated with a BSC 208. Transmissions over air interface 203 from BTS 206 to AT 202 represent the forward link to the access terminal, while transmissions over interface 203 from AT 202 to BTS 206 represent the reverse link.

BSC 208 is connected to MSC 210, which acts to control assignment of air traffic channels (e.g., over air interface 203), and provides access to wireless circuit-switched services such as circuit-voice and circuit-data (e.g., modem-based packet data) service. As represented by its connection to PSTN 214, MSC 210 is also coupled with one or more other MSCs or other telephony circuit switches in the operator's (or in a different operator's) network, thereby supporting user mobility across MSC regions, and local and long-distance landline telephone services. Also connected to MSC 210 is home location register (HLR) 212, which supports mobility-related aspects of subscriber services, including dynamic tracking of subscriber registration location and verification of service privileges.

As shown, BSC 208 is also connected with a PDSN 218 by way of packet control function (PCF) 216. PDSN 218 in turn provides connectivity with a packet-switched network 220, such as the Internet and/or a wireless carrier's private core packet-network. Sitting as nodes on network 220 are, by way of example, an authentication, authorization, and accounting (AAA) server 222, a mobile-IP home agent (HA) 224, and a remote computer 226. After acquiring an air traffic channel over its air interface, an access terminal (e.g., AT 202) may send a request to PDSN 218 for a connection in the packet data network. Then, following authentication of the access terminal by AAA server 220, the access terminal may be assigned an IP address by the PDSN or by HA 224, and may thereafter engage in packet-data communications with entities such as remote computer 226.

It should be understood that the depiction of just one of each network element in FIG. 2 is illustrative, and there could be more than one of any of them, as well as other types of elements not shown. The particular arrangement shown in FIG. 2 should not be viewed as limiting with respect to the present invention. Further, the network components that make up a wireless communication system such as system 200 are typically implemented as a combination of one or more integrated and/or distributed platforms, each comprising one or more computer processors, one or more forms of computer-readable storage (e.g., disks drives, random access memory, etc.), one or more communication interfaces for interconnection between elements and the network, and operable to transmit and receive the communications and messages described herein, and one or more computer software programs and related data (e.g., machine-language instructions and program and user data) stored in the one or more forms of computer-readable storage and executable by the one or more computer processors to carry out the functions, steps, and procedures of the various embodiments of the present invention described herein. Similarly, a communication device such as exemplary access terminal 202 typically comprises a user-interface, I/O components, a communication interface, a tone detector, a processing unit, and data storage, all of which may be coupled together by a system bus or other mechanism. As such, system 200, AT 202, and air interface 203, collectively are representative of exemplary means of implementing and carrying out the various functions, steps, and procedures described herein.

Throughout this description, the term "base station" will be used to refer to a Radio Access Network (RAN) element such as a BTS, a BSC, or combination BTS/BSC, for instance. The term "radio network controller" (RNC) can also be used to refer to a BSC, or more generally to a base station. In some arrangements, two or more RNCs may be grouped together, wherein one of them carries out certain control functions of the group, such as coordinating handoffs across BTSs of the respective RNCs in the group. The term controlling RNC (or C-RNC) customarily applies to the RNC that carries out these (and possibly other) control functions.

1. Conventional CDMA Communications

In a conventional CDMA wireless network compliant with the well known IS-2000 standard, each cell employs one or more carrier frequencies, typically 1.25 MHz in bandwidth each, and each sector is distinguished from adjacent sectors by a pseudo-random number offset ("PN offset"). Further, each sector can concurrently communicate on multiple different channels, distinguished by "Walsh codes." In doing so, each channel is allocated a fraction of the total power available in the sector. When an access terminal operates in a given sector, communications between the access terminal and the BTS of the sector are carried on a given frequency and are encoded by the sector's PN offset and a given Walsh code. The power allocated to each channel is determined so as to optimize the signal to noise characteristics of all the channels, and may vary with time according to the number of access terminals being service, and their relative positions with respect to the BTS, among other factors.

Air interface communications are divided into forward link communications, which are those passing from the base station to the access terminal, and reverse link communications, which are those passing from the access terminal to the base station. In an IS-2000 system, both the forward link and reverse link communications in a given sector are encoded by the sector's PN offset and a given Walsh code. On the forward link, certain Walsh codes are reserved for use to define control channels, including a pilot channel, a sync channel, and one or more paging channels, and the remainder can be assigned dynamically for use as traffic channels, i.e., to carry user communications. Similarly, on the reverse link, one or more Walsh codes may be reserved for use to define access channels, and the remainder can be assigned dynamically for use as traffic channels.

With the arrangement described above, an access terminal can engage in cellular voice and/or in packet-data (1X-RTT) communications. Referring again to FIG. 2, and taking an originating call from AT 202 as an example, AT 202 first sends an origination request over air interface 203 and via the BTS 206 and BSC 208 to MSC 210. The MSC then signals back to the BSC directing the BSC to assign an air interface traffic channel for use by the access terminal. For a voice call, the MSC uses well-known circuit protocols to signal call setup and establish a circuit connection to a destination switch that can then connect the call to a called device (e.g., landline phone or another access terminal). For a packet-data session, the BSC signals to the PDSN 218 by way of PCF 216. The PDSN 218 and access terminal 202 then negotiate to establish a data link layer connection, such as a point to point protocol (PPP) session. Further, the PDSN 218 sends a foreign agent advertisement that includes a challenge value to the access terminal, and the access terminal responds with a mobile-IP registration request (MIP RRQ), including a response to the challenge, which the PDSN forwards to HA 224. The HA then assigns an IP address for the access terminal to use, and the PDSN passes that IP address via the BSC to the access terminal.

In order to facilitate efficient and reliable handoff of access terminals between sectors, an AT can communicate on a given carrier frequency with a number of "active" sectors concurrently under IS-2000. Depending on the system, the number of active sectors can be up to three or six (currently). The access terminal receives largely the same signal from each of the active sectors and, on a frame-by-frame basis, selects the best signal to use. An access terminal maintains in its memory a list of its active sectors, identified according to their PN offsets. This list comprises the AT's "active set."

Operationally, an IS-2000 system is typically arranged to transmit the same data concurrently on a given carrier frequency in some or all of the sectors of a given AT's active set, encoding each transmission according to the PN offset of the respective sector and the Walsh code for the assigned channel therein. Correspondingly, the AT recognizes the concurrent transmissions according to the PN offsets of the sectors in its active set and the Walsh codes of its assigned channels. That is, operating under IS-2000, the AT will decode transmissions using all the PN offsets in its active set, together with the respective Walsh codes assigned for each PN-identified sector. The concurrent transmissions in sectors of the AT's active set provides an added level of reliability to communications, as well as possibly increased quality owing to improved signal to noise characteristics. The concurrency also facilitates a form of seamless handoff between sectors, referred to as "soft handoff" when the handoff is between sectors of different BTSs, and "softer handoff" when the handoff is between sectors of the same BTS.

In addition to its active set, the AT maintains in its memory a list of "candidate" sectors (typically up to six), which are those sectors that are not yet in the active set but that have sufficient signal strength that the access terminal could demodulate signals from those sectors. Further, the mobile maintains a list of "neighbor" sectors, which are those sectors not in the active set or candidate set but are in close vicinity to the access terminal and deemed by the wireless communication system to be ones that the access terminal should monitor for eligibility as candidate sectors. All other possible sectors are members of a "remaining" set.

To facilitate a determination of which sectors should be in the access terminal's active and candidate sets, all base stations emit a pilot channel signal, typically at a power level higher than other forward link signals. An access terminal then constantly measures the strength of each pilot that it receives and notifies a primary base station (a base station currently serving the access terminal) when pilot strength falls above or below designated thresholds. The base station, in turn, provides the access terminal with an updated list of active pilots.

More particularly, according to the well known EIA/TIA/IS-95 standard or EIA/TIA/IS-2000 standard, the base station initially provides the access terminal with a Handoff Direction Message (HDM), which indicates (i) the PN offsets of the sectors in the active set and (ii) the following handoff parameters that relate to pilot signal strength:

T_ADD: Threshold pilot strength for addition to the active set (e.g., −14 dB)

T_COMP: Difference in signal strength from an active set pilot (e.g., 2 dB)

T_DROP: Threshold pilot strength for removal from the active set (e.g., −16 dB)

T_TDROP: Time for which an active set pilot falls below T_DROP to justify removal from the active set (e.g., 2 seconds)

Additionally, the base station initially provides the access terminal with a Neighbor List Update Message (NLUM), which identifies the "neighbor" sectors for the current active set.

The access terminal then monitors all of the pilot signals that it receives, measuring signal strength for each as $E_c/I_o$, where $E_c$ is energy per chip and $I_o$ is the total power received. If the pilot signal strength of any neighbor sector exceeds T_ADD, the access terminal adds the pilot to its "candidate" set and sends a Pilot Strength Measurement Message (PSMM) to the base station with the estimated $E_c/I_o$ for the pilot and information indicative of the identity of the sector. If the pilot strength exceeds any active sector signal by T_COMP, and depending on current capacity and other issues, the base station may then send an HDM to the access terminal, listing the pilot as a new member of the active set. Upon receipt of the HDM, the access terminal then adds the pilot to its active set as instructed, and the access terminal sends a Handoff Completion Message (HCM) to the base station, acknowledging the instruction, and providing a list of the pilots (PN offsets) in its active set. Depending on system configuration, the access terminal may also identify pilot signals from the remaining set of sectors if they exceed the thresholds.

Similarly, if the access terminal detects that the signal strength of a pilot in its active set drops below T_DROP, the access terminal starts a handoff drop timer. If T_TDROP passes, the access terminal then sends a PSMM to the base station, indicating the $E_c/I_o$ and drop timer. The base station may then respond by sending an HDM to the access terminal, without the pilot in the active set. The access terminal would then receive the HDM and responsively move the pilot to its neighbor set and send an HCM to the base station.

2. High Rate Packet-Data Communications

Under IS-2000, the highest rate of packet-data communications theoretically available on a fundamental traffic channel of the forward link is 9.6 kbps, dependent in part on the power allocated to the forward-link traffic channel and the resultant signal to noise characteristics. In order to provide higher rate packet-data service to support higher bandwidth applications, the industry introduced a new "high rate packet data (HRPD) system," which is defined by industry standard IS-856.

IS-856 leverages the asymmetric characteristics of most IP traffic, in which the forward link typically carries a higher load than the reverse link. Under IS-856, each access terminal maintains and manages an active set as described above, but receives forward-link transmission from only one active sector at a time. In turn, each sector transmits to all its active ATs on a common forward link using time division multiplexing (TDM), in order to transmit to only one access terminal at a time, but at the full power of the sector. The reverse link under IS-856 retains largely the traditional IS-2000 code division multiplexing (CDM) format, albeit with the addition of a "data rate control" (DRC) channel used to indicate the supportable data rate and best serving sector for the forward link. As a result of the full-power allocation by the sector, an access terminal operating under IS-856 can, in theory, receive packet-data at a rate of at least 38.4 kbps and up to 2.4 Mbps.

The IS-856 forward link is divided into time slots of length 2048 chips, and each time slot is further time division multiplexed to carry various channels, including a pilot channel, a Medium Access Control (MAC) channel, and, if any traffic exists, a forward traffic channel and a "control" channel. The pilot and MAC channels are together allocated 224 chips twice per time slot (a total of 448 chips) at pre-assigned positions within each time slot (i.e., at pre-assigned phases of each slot). The remaining chips are allocated for forward traffic ("data chips") or control. As in IS-2000, each sector in IS-856 is defined by a PN offset, and the pilot channel carries an indication of the sector's PN offset. Also as in IS-2000, an access terminal operating under IS-856 monitors the pilot signal emitted by various sectors as a basis to facilitate active set management, i.e., to facilitate handoff from one sector to another.

IS-856 introduces a "virtual soft handoff" concept, in which an access terminal communicates with the network on just a "best" sector of its active set at any given time. As in IS-2000, the access terminal monitors the signal strength of pilot signals emitted by various sectors, and the access terminal uses threshold handoff parameters such as those noted above as a basis to trigger the addition of a sector to the access terminal's candidate set. Further as in IS-2000, the access terminal then sends a revised candidate set to the network, and the network decides whether to revise the access terminal's active set. If the network decides to update the access terminal's active set, the network sends an HDM to the access terminal and further instructs each sector to communicate with the access terminal. Note that the term "virtual soft handoff" may occasionally be abbreviated herein as just "soft handoff" when discussing IS-856.

Unlike IS-2000 in which forward traffic information is routed to all sectors in the access terminal's active set, forward traffic under IS-856 is routed to only a "best" sector that the access terminal selects from its active set, typically the sector that has the strongest pilot strength. In practice, the access terminal will monitor the pilot signals of the sectors in its active set, and will include in its DRC (on the reverse link) an indication of the selected serving sector. Unless and until the AT later selects a different sector, only that sector will then serve the access terminal with forward-link data, transmitting them at full power during time slots allocated for the AT. In turn, the AT will only process and decode transmissions according to the PN offset of its currently-selected sector and its time slots allocated therein. That is, while other sectors in the AT's active set may also be concurrently transmitting data on their respective forward-link channels, under IS-856, the data will not be intended for the AT, and the AT will not attempt to use the other sectors' PN offsets for decoding. And within its currently-selected sector, the AT will only decode those time slots that are intended for the AT (identified according to a MAC identifier, as described below).

Operation in an IS-856 compliant communication system may be illustrated, again with reference to FIG. 2. To acquire packet data connectivity under IS-856, after an access terminal first detects an IS-856 carrier, the access terminal sends to its BSC (or RNC) 208 a UATI (Universal Access Terminal Identifier) request, and receives in response an UATI, which the access terminal can then use to identify itself in subsequent communications with the BSC. The access terminal then sends a connection-request to the BSC 208, and the BSC responsively invokes a process to authenticate the access terminal and to have the access terminal acquire a data link.

In particular, the BSC 208 sends an access request to an Access Network AAA (ANAAA) server (which may be different than the AAA server 222), and the ANAAA server authenticates the access terminal. The BSC 208 then assigns radio resources for the data session, providing a MAC identifier ("MAC ID") to the AT for identifying its time-slot data sent in the forward-link traffic channel, and a Walsh code for a sending data on the reverse-link traffic channel. Further, the BSC signals to the PDSN 218 (via PCF 216), and the PDSN and access terminal then negotiate to establish a PPP data link. In addition, as in the IS-2000 process, the access terminal then sends an MIP RRQ to the PDSN, which the PDSN forwards to the HA 224, and the HA assigns a mobile-IP address for the access terminal to use.

Once the access terminal has acquired an IS-856 radio link, a data link, and an IP address, the access terminal is considered to be in an active mode. In active mode, the AT receives its data distributed across MAC-identified time slots transmitted by the BTS using the full power of the forward link of the sector selected by the AT (as described above). Thus, the access terminal recognizes its time-slot data from among other time slots by a MAC identifier included in each transmission, and processes only those time slots with the AT's assigned MAC identifier. Using the full power of the forward link maximizes the signal to noise ratio, thus facilitating higher rate data communication than the power-limited CDMA channels.

3. Optimizing Handoff Performance Across a Frequency Border

The soft (and softer) handoff under IS-2000 and the virtual soft handoff under IS-856 are both facilitated by the introduction of the active set. As described above, all of an AT's active sectors transmit on the same carrier frequency. In practice, a wireless service provider may utilize more than one carrier frequency across some or all of its wireless communication system. For example, on a single, given carrier frequency in any given sector there are a limited number of Walsh codes for use under IS-2000 and/or a limited number of MAC IDs for use under IS-856. Consequently, the number of access terminals that a sector or cell can serve on a single carrier frequency at any one time under either IS-2000 or IS-856 is limited. A service provider may therefore implement more than one carrier frequency in certain sectors or cells within those regions or markets where demand for service generally exceeds the capacity of a single carrier frequency. Each carrier frequency could then accommodate a different set of (the limited number of) MAC IDs and/or Walsh codes. It will be appreciated that there could be other reasons as well for deploying more than one carrier frequency.

Typically, a wireless service provider will employ a common carrier frequency across its entire wireless communication system (i.e., in all cells, sectors, or other coverage areas), and add one or more additional carrier frequencies in the cells and/or sectors of regions where increased capacity is needed. One result of such a configuration is the occurrence of "frequency borders," which roughly delineate the boundary between two neighboring coverage areas (e.g., cells or sectors) that each respectively employ at least one different carrier frequency. For instance, a first sector may be located within, but near the outer reaches of, a high-traffic region in which both a first carrier frequency and the common carrier frequency are employed, while a second sector may be located just outside the high-traffic region where only the common carrier frequency is employed. Since the first carrier frequency is used only within the high-traffic region, there is a potential change in carrier frequencies for access terminals moving between the two sectors. More specifically, an AT that is operating in the first sector on the first carrier frequency must transition to the common carrier frequency in order to operate in the second sector. Movement of an AT between two such sectors thus represents movement across a frequency border.

Since, as noted, soft (or softer) handoff and virtual soft handoff of an AT rely on sectors in the AT's active set, and since all sectors in an AT's active set transmit to the AT on the same carrier frequency, soft handoff or virtual soft handoff of an AT that crosses a frequency border may not be possible. In particular, if an AT cannot make a (possibly) required switch in carrier frequency prior to a handoff across a frequency border, then the AT will be subject to a "hard handoff," which has a higher probability of service interruption (e.g., dropped call or session) than does either a soft handoff or a virtual soft handoff. Taking again the example of a first coverage area that supports both a first carrier frequency and a second, common carrier frequency and a second coverage area that supports only the second, common carrier frequency, an AT operating on the common carrier frequency in the first coverage area can move to the second coverage area by way of a soft or virtual soft handoff, since no switch in carrier frequency in required in this case. However, if the AT must move from the first to the second coverage area while operating on the first carrier frequency, then a switch in carrier frequency must take place as part of the handoff, making the handoff a hard handoff.

During a soft or virtual soft handoff, an AT remains on its current carrier frequency, enabling it to maintain its channel connectivity to all its active set members, thereby enhancing the robustness and reliability of the handoff. By contrast, during a hard handoff, the switch in carrier frequency forfeits the AT's ability to rely on its active set members even as it must drop its channel connectivity with its current (source) sector and acquire channel connectivity to its new (target) sector. This may result in a temporary interruption in channel connectivity for the AT, and a possibly irrecoverable delay or interruption of wireless service, such as a dropped call or data session.

In order to mitigate the effects of a hard handoff of an access terminal across a frequency border between a first (source) coverage area and a second (target) coverage area, the AT's serving base station (or other RAN element) in the first coverage area will first "hand down" the AT from its current carrier frequency to a carrier frequency that is common to both the source and target coverage areas. That is, the AT will switch to the carrier frequency employed in the target coverage area before the handoff proceeds. In this way, the handoff across the frequency border becomes a soft handoff or a virtual soft handoff, and thus one that is more robust and reliable. By convention, the AT is said to hand down from a "source frequency" to a "target frequency." In the case of a hand-down to facilitate a frequency-border handoff, the target frequency is the carrier frequency that is common to both coverage areas of the handoff (i.e., the common carrier frequency).

Operationally, a hand-down from a source to a target carrier frequency of a given access terminal in a coverage area requires allocation to the AT of an identifier for use on the target carrier frequency in that coverage area (e.g., cell or sector). For example, if the AT is operating under IS-2000, then it is using one of the coverage area's Walsh codes on the source frequency for its forward channel. Handing down the AT to the target frequency then requires allocation to the AT of a Walsh code for use on the target frequency. Similarly, if the AT is operating under IS-856, then it is using one of the coverage area's MAC IDs on the source frequency for its forward channel. In this case, handing down the AT to the target frequency requires allocation to the AT of a MAC ID for use on the target frequency. However, the availability of an appropriate identifier (e.g., Walsh code or MAC ID) is not generally guaranteed. For instance, all of the limited number of such identifiers in a cell or sector may already have been allocated to other access terminals. In this case, a hand down prior to handoff is not possible, and an AT moving across a frequency border may then be forced into a hard handoff for lack of an appropriate identifier for use on the common carrier frequency in the first (source) coverage area.

Figure 3:
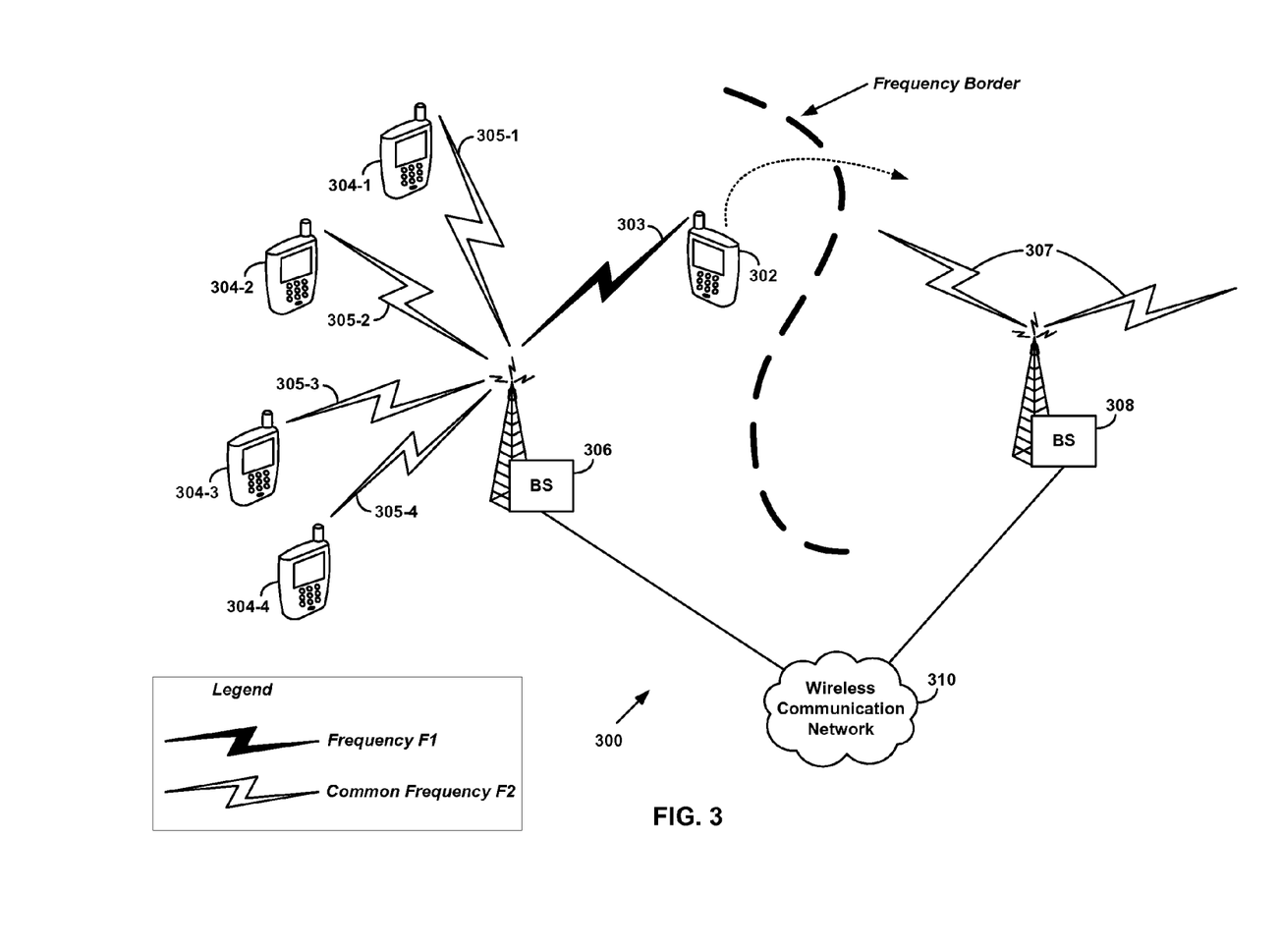
FIG. 3 is a simplified block diagram of a wireless communication system illustrating the presence of a frequency border between adjacent coverage areas.

FIG. 3 illustrates a circumstance within a network 300 in which a hard handoff across a frequency border may occur. Access terminal 302 has an air interface 303 with base station ("BS") 306. The base station could include a BTS and BSC, as well as possibly a PCF, for instance, and air interface 303 could support IS-2000 and/or IS-856, for example. As indicated in the Legend to the figure, air interface 303 (depicted as a solid black "lightning bolt") utilizes carrier frequency "F1." Also shown are four additional access terminals 304-1, 304-2, 304-3, and 304-4, each in communication with BS 306 via air interfaces 305-1, 305-2, 305-3, and 305-4, respectively. These four air interfaces (depicted as outlined "lightning bolts") could also support IS-2000 and/or IS-856, and as indicated in the Legend, all utilize a common carrier frequency "F2." By way of example, BS 306 employs both carrier frequencies F1 and F2.

BS 306 is connected to wireless communication network 310, which could include one or more elements similar to those shown in FIG. 2, such as MSCs, HLRs, PCFs, PDSNs, as well as a PSTN (or connectivity to a PSTN), a packet switched network, and various servers (e.g., AAA and HA). Also connected to network 310 is a second base station 308, which may be similar BS 306, but which, again by way of example, only employs the common carrier frequency F2, as indicated by air interfaces 307.

Because BS 306 employs both carrier frequencies F1 and F2 while BS 308 employs only F2, the separation between the respective coverage areas of these two base stations represents a frequency border, indicated in FIG. 3 by a thick, curved, dashed line. In actuality, the separation is not generally a precise locus of points, but a region across which RF coverage transitions from one base station to the other. As indicated by the thin, dashed, curved arrow, AT 302 is evidently traveling from the first coverage area of BS 306 to the second coverage area of BS 308. Consequently, the network will hand off AT 302 from the first coverage area (of BS 306) to the second coverage area (of BS 308). Assuming for purposes of illustration that all of the limited number of identifiers (e.g., MAC IDs or Walsh codes) for use on F2 in the first coverage area are being used by other access terminals (e.g., ATs 304-1, 304-2, 304-3, 304-4, etc.), AT 302 will then have to remain on carrier frequency F1 during the handoff. But since BS 308 employs only common carrier frequency F2, the handoff will be a hard handoff.

It may be the case that one or more of other access terminals that have been allocated the limited number of identifiers for use on F2 in the first coverage area (i.e., of BS 306) is engaged in data communications that can tolerate some degree of interruption or delay. For instance, such an access terminal may be engaged in a non-real-time file transfer, such as an FTP download, or an email transfer. In practice, a wireless communication system may designate different levels of service according to data transport requirements and the applications that run on top of them, and can then assign service levels to access terminals according to their needs. (Service levels could also be assigned according to service level agreements with subscribers.) An application that is not sensitive to delay in the transfer of data can generally be accommodated with so-called "best effort" service, wherein data transport is provided according to instantaneous bandwidth availability, for example.

In accordance with example embodiments of the present invention, a base station or other RAN element of a first coverage area will advantageously temporarily reassign an identifier from an AT that is receiving best effort service (or some other given level of service) to a given AT that would otherwise be subject to a hard handoff to a second coverage area. The transition of the AT from the first to the second coverage area can then be accomplished with a soft handoff or a virtual soft handoff. During the handoff, communication with the AT receiving best effort service will be suspended. The suspended communication will be resumed once an appropriate identifier becomes available.

Referring again to FIG. 3 for illustration, source BS 306 (serving the first coverage area) will determine that AT 302 on carrier frequency F1 needs to be handed off to target BS 308, which employs only common carrier frequency F2. BS 306 may also determine that all of its limited number of identifiers for use on F2 are already assigned to other ATs that it is serving (e.g., ATs 304-1, 304-2, 304-3, 304-4, etc.). Base station 306 may then identify one or more of these other ATs (on F2) as having been designated to receive best effort service. Advantageously, BS 306 will select one of the one or more ATs receiving best effort service, temporarily suspend that AT's communications, and reassign that AT's identifier on F2 to AT 302. The reassigned identifier may be considered as having been borrowed, and is thus referred to herein as a "borrowed identifier."

Having assigned the borrowed identifier to AT 302, BS 306 will hand down AT 302 from the first (source) carrier frequency F1 to the second (target), common carrier frequency F2, and then hand off AT 302 to target BS 308 (serving the second coverage area) on F2, using a soft handoff or a virtual soft handoff. Once the handoff to BS 308 is complete and AT 302 has an active air interface on F2 to BS 308, AT 302 will release its air interface on F2 to BS 306, thereby relinquishing the borrowed identifier and making it available again for use in the first coverage area. Finally, BS 306 will resume communications with the AT from which the identifier was borrowed, either by reassigning the borrowed identifier back to that AT, or by assigning to the AT another identifier on F2 that may have become available during the time in which the hand-down and handoff of AT 302 was carried out.

By way of example, AT 302 could be operating under IS-2000 on F1 in the first coverage area when the need for handoff to target BS 308 is determined. BS 306 might then determine that all of its limited number of Walsh codes for forward channels on F2 are already assigned to other ATs it is serving under IS-2000. In this case, the borrowed identifier would be a borrowed Walsh code obtained from an AT receiving best effort service under IS-2000 on a forward channel on common carrier frequency F2. Further, the handoff of AT 302 would be a soft (or possibly a softer) handoff. Alternatively, with AT 302 operating under IS-856 on F1 in the first coverage area, BS 306 might determine that all of its limited number of MAC IDs for forward channels on F2 are already assigned to other ATs it is serving under IS-856. In this case, the borrowed identifier would be a borrowed MAC ID obtained from an AT receiving best effort service under IS-856 on a forward channel on common carrier frequency F2, and the handoff of AT 302 would be a virtual soft handoff.

The air interface between an access terminal and a base station (or BTS) is an example of what may be more generally considered a physical communication link, and referred to herein as a "channel band." Other examples of a channel band could include, without limitation, a wireline connection (e.g., "Ethernet"), a fiber optic connection, or wireless local area network connection (e.g., WiFi). Additionally, carrier frequency is an example of what may be considered an attribute the RF air interface, and referred to more generally herein as a "channel-band attribute." In the context of a CDMA family of protocols, carrier frequency typically defines both a segment of bandwidth (e.g., 1.25 MHz) and a center frequency of the bandwidth (or other frequency position within the defined bandwidth). Other examples of a channel-band attribute could include, without limitation, amplitude, phase, and encoding definition (e.g., modulation method). The center frequency of the carrier frequency may then be considered as more generally setting a "value" of a channel-band attribute. The "value" could also specify a particular value of amplitude, phase, or a parameter of a modulation method, for example.

The above definitions can be applied to a generalized embodiment of the present invention, wherein, in a wireless communication system, a determination is made that a given access terminal that is communicating in a first coverage area on a first channel band that has a first value of a particular channel-band attribute, needs to be handed off to a second channel band that has a second value of the particular channel-band attribute in a second coverage area. In accordance with the generalized embodiment, a determination is also made that all of a plurality of identifiers that could be used to facilitate (1) switching the given access terminal from the first channel band to the second channel band in the first coverage area, and (2) handing off the access terminal to the second coverage area, are assigned to other access terminals. A determination could then be made that at least one of the other access terminals is currently designated to receive a particular level of service (e.g., best effort) in the wireless communication system. The identifier (from among the plurality of identifiers) assigned to the at least one of the other access terminals could then be reassigned to the given access terminal. Using the reassigned identifier, the given access terminal could be switched to the second channel band in the first coverage area, and then handed off to the second coverage area on the second channel band. Following the handoff, the given access terminal could relinquish the identifier, thereby making it available again in the first coverage area. Finally, the access terminal from which the identifier was reassigned could again be newly assigned an identifier on the second channel band in the first coverage area, wherein the newly assigned identifier could either be the one relinquished by the given access terminal, or an identifier that became available roughly during the time interval that the handoff of the given access terminal was being carried out.

4. Example Embodiments and Operation of Optimized Frequency-Border Handoff

Figure 4:
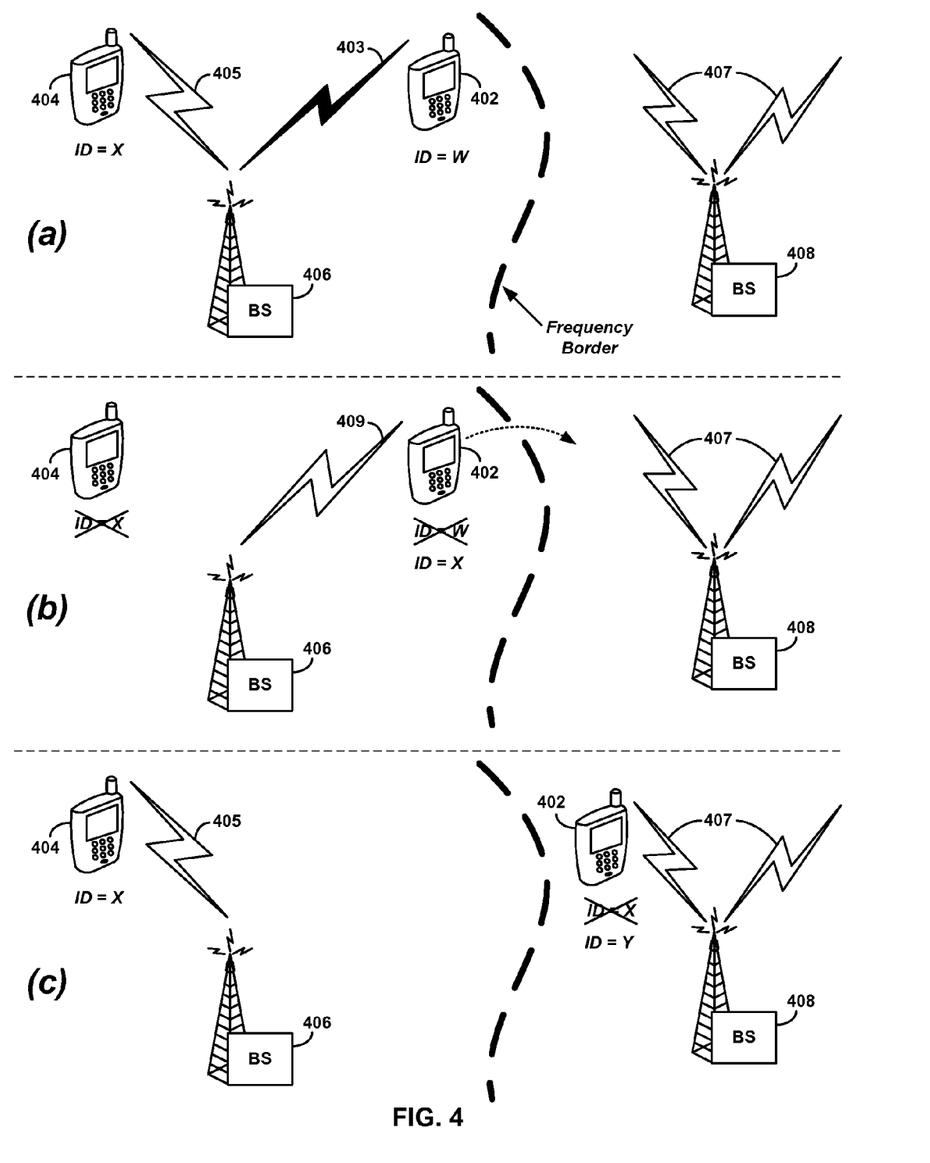

An example of operation of optimized handoff of an access terminal across a frequency border is illustrated in FIG. 4(*a-c*), which depicts ATs 402 and 404 and base stations 406 and 408. By way of example, the two base stations are on opposite sides of a frequency border (shown as a heavy, dashed, curved line). Also shown are various air interfaces, representing a first carrier frequency F1 and a second, common carrier frequency F2 (each depicted with the same symbols used in FIG. 3 for F1 and F2). For the sake of brevity, no other elements of the wireless communication system are shown besides BSs 406 and 408. Is should be understood, however, that the network context of FIG. 4 is similar to that of network 200 in FIG. 2 or network 300 in FIG. 3, for instance.

In FIG. 4*a*, AT 402 is shown to have an air interface 403 on carrier frequency F1 to BS 406. The label "ID=W" below AT 402 indicates that AT 402 is using an identifier designated (for purposes of illustration) simply as "W" on its air interface. Also in FIG. 4*a*, AT 404 is shown to have an air interface 405 on common carrier frequency F2 to BS 406. By way of example, AT 404 is using an identifier designated as "X" on its air interface. Thus, BS 406 employs both F1 and F2, while BS 408 is shown as deploying only F2 (as represented by air interfaces 407). In accordance with the description above, AT 402 will need to acquire an air interface on F2 in order to handoff to BS 408 by way of a soft or virtual soft handoff.

In FIG. 4*b*, BS 406 (or some other element of the RAN, not shown) suspends communication with AT 404 and reassigns identifier X to AT 402, as indicated by the crossed-out label below AT 404 and the absence of air interface 405. Also shown in FIG. 4*b*, AT 402 has been handed down to common carrier frequency F2 in the first coverage area, thereby acquiring air interface 409 on F2. This is indicated by the crossed-out label "ID=W" and the added label "ID=X" below AT 402. A dashed arrow from AT 402 across the frequency border toward BS 408 represents a soft or virtual soft handoff to BS 408.

Finally, in FIG. 4*c*, the AT 402 acquires (as part of the handoff) an identifier "Y" in the second coverage area, using it on newly-established air interface 407 to BS 408. The handoff being complete, identifier X is returned from AT 402 to the first coverage area, where it is once again assigned to AT 404. As shown, the label "ID=X" below AT 402 is crossed out and replaced by "ID=Y." Also, air interface 409 is absent from FIG. 4*c*, while air interface 405 between AT 404 and BS 406 has been restored (as has the label "ID=X" below AT 404).

The example embodiments described above generally apply to both IS-2000 and IS-856, but with differences according to the type of identifier that is used (and borrowed)—a Walsh code in the case of IS-2000 and a MAC ID in the case of IS-856. There other details that differ between implementations for IS-2000 and IS-856, as well. Example embodiments applied to IS-856 data communications (EV-DO communications) and IS-2000 data communications (1X-RTT communications) are discussed separately below. In both embodiments, the coverage areas described as cells. It should be understood other types of coverage areas, such as sectors, could be used as well.

a. EV-DO Communications

Figure 5:
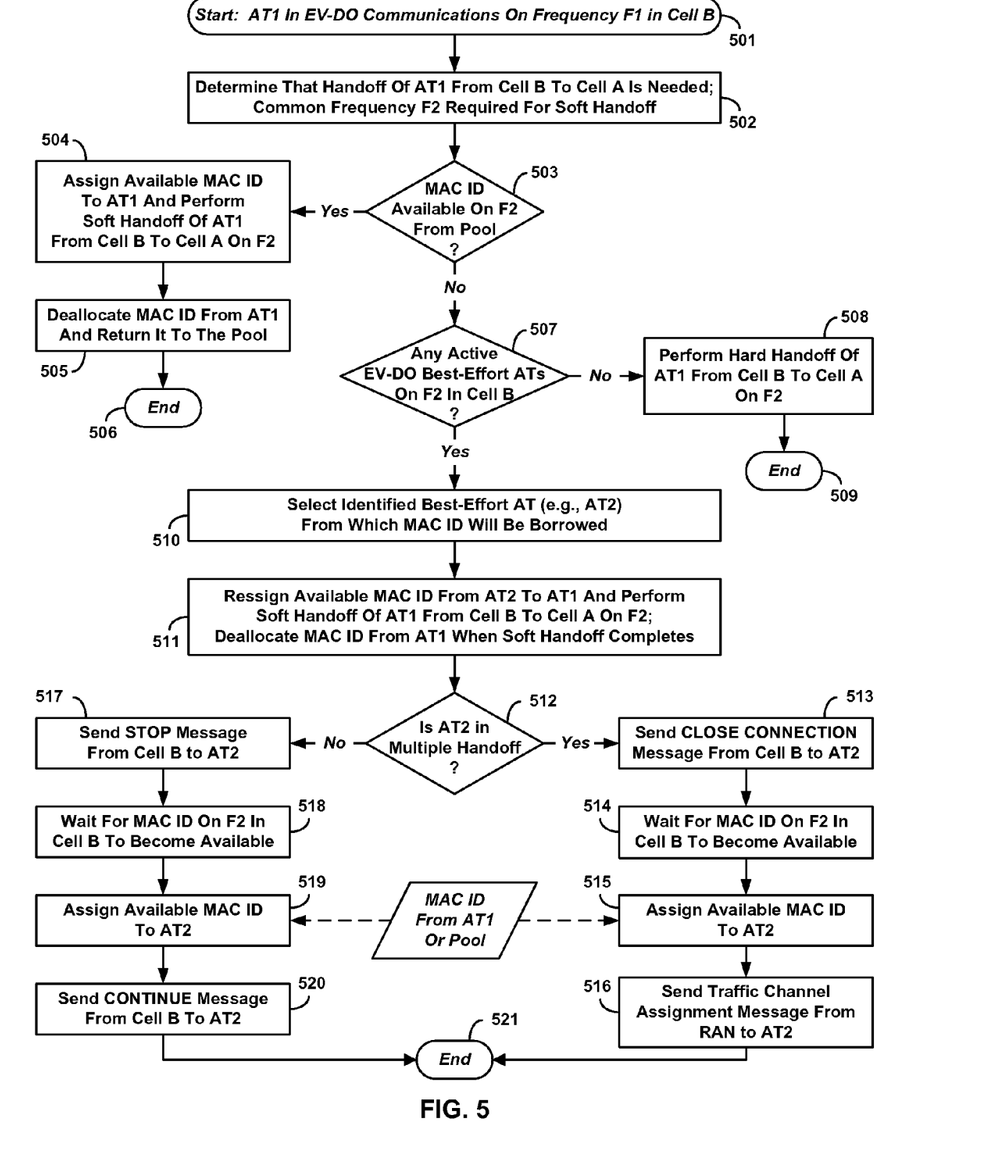
FIG. 5 is a flowchart depicting an example embodiment of optimized handoff for EV-DO communication.

FIG. 5 illustrates an embodiment of optimized handoff across a frequency border as applied to EV-DO communication (i.e., under IS-856). The process begins at step 501, at which point access terminal AT1 is assumed to be already engaged in EV-DO communications on carrier frequency F1 in a first coverage area, designated as "cell B." At step 502, a determination is made that AT1 needs to be handed off to "cell A" on common carrier frequency F2. This determination could be made my AT1's serving base station (in cell B) or some other element of the RAN, for example. In order for this to be a virtual soft handoff, AT1 will first have to be handed down to F2 in cell B.

At step 503, a determination is made (again at the serving base station) as to whether or not there is an unassigned MAC ID available (e.g., from a pool) on F2 in cell B in order to facilitate the hand-down. If such a MAC ID is available (branch labeled "Yes" from step 503), it is assigned to AT1 and a virtual soft handoff of AT1 on F2 is carried out, as indicated at step 504 (the hand-down may be considered as implicit in this step). At step 505, AT1 returns the MAC ID to cell B, thereby also releasing its connection on F2 to the source base station in cell B. At this point, AT1 has an EV-DO connection on F2 with the target base station in cell A, and the process is complete (as indicated at step 506).

If all MAC IDs on F2 in cell B are already assigned to other ATs (branch labeled "No" from step 503), then a determination is made at step 507 as to whether any of the other ATs are receiving best effort service. If none are receiving best effort service (or some other level of service designated as being appropriate for borrowing a MAC ID), then, as indicated by the branch labeled "No" from step 507, a hard handoff is carried out at step 508. The process then completes at step 509.

If there are ATs on F2 in cell B that are receiving best effort service (branch labeled "Yes" from step 507), then one of them is selected from which a MAC ID will be borrowed. For purposes of the present discussion, the access terminal selected is designated AT2, as indicated in step 510. At step 511, the MAC ID assigned to AT2 is reassigned to AT1, thereby enabling AT1 to hand down from F1 to F2 in cell B. Once AT1 has a forward channel on F2 from the source base station in cell B (using the MAC ID reassigned from AT2), a virtual soft handoff of AT1 from cell B to cell A is carried out on common carrier frequency F2. As with step 504, the hand-down may be considered as implicit in step 511. When the virtual soft handoff is complete, AT1 returns the MAC ID to cell B, thereby also releasing its connection on F2 to the source base station in cell B.

Among the details that apply to optimized handoff of EV-DO communications, beside the use of a MAC ID for the identifier, is how communications with AT2 are handled with, and following, reassignment of its MAC ID to AT1. This aspect of present embodiment is shown in steps 512-520. Note that while these steps are depicted as following step 511, some or all of them could in practice occur in parallel with the reassignment and/or handoff of step 511; their depiction as logically following step 511 largely serves the purpose of separately illustrating the handling of AT2 in the time during which AT2's MAC ID is reassigned to AT1.

At step 512, a determination is made as to whether AT2 is in "multiple handoff" mode. More specifically, an AT that has more than one sector (or other coverage area) in its active set is said to be in multiple handoff mode. As described above, a plurality of sectors in an AT's active set facilitates virtual soft handoff because the AT can maintain its forward channel with its source sector while activating communications on a forward channel with its target sector. Hence the term multiple handoff. By contrast, an AT that has a forward channel only with its current serving sector and has no other sectors in its active set, can communicate with only that serving sector at any given time. Such an AT is therefore not in multiple handoff mode.

If AT2 is determined at step 512 to be in multiple handoff mode (the branch labeled "Yes" from step 512), the base station in cell B sends a Close Connection message to AT2, as indicated at step 513. Any active communication from cell B to AT2 (i.e., best effort communication) will thereby be suspended. As indicated at step 514, AT2 then waits for a MAC ID to again become available on F2 in cell B. Note that during this period, AT2 may still be detecting a strong pilot signal from cell B, since the Close Connection message was triggered by the need to borrow AT2's MAC ID, not by any deficiency in signal strength. Therefore, AT2 may continue to send requests on its reverse channel for a forward channel from cell B. However, the base station in cell B will deny (or ignore) those requests, since AT2's MAC ID in cell B was borrowed and reassigned to AT1. Note that AT2 may engage in EV-DO communication with another member of its active set while it waits to reconnect with cell B.

At step 515, a MAC ID on F2 in cell B becomes available, either from AT1 upon completion of its handoff to cell A or from one or more of the other ATs in cell B that has in the interim relinquished a MAC ID on F2. Once available, the MAC ID is assigned to AT2, and communication with AT2 on F2 in cell B can resume. This is indicated at step 516, where the base station in cell B sends a Traffic Channel Assignment Message to AT2. The process is then complete, as indicated at step 521.

If AT2 is determined at step 512 to not be in multiple handoff mode (the branch labeled "No" from step 512), the base station in cell B sends a Stop message to AT2, as indicated at step 517. Any active communication to AT2 (i.e., best effort communication) will also thereby be suspended. At step 518, AT2 then waits for a MAC ID to again become available on F2 in cell B. Once a MAC ID on F2 in cell B becomes available, it is assigned to AT2 (step 519), and communication resumes upon a Continue message from the base station in cell B, as indicated at step 520. Again, step 521 indicates that the process is now complete. Note that the Stop and Continue messages could involve new messages that are not currently defined within IS-856, IS-2000, or other CDMA protocols.

b. 1X-RTT Communications

Figure 6:
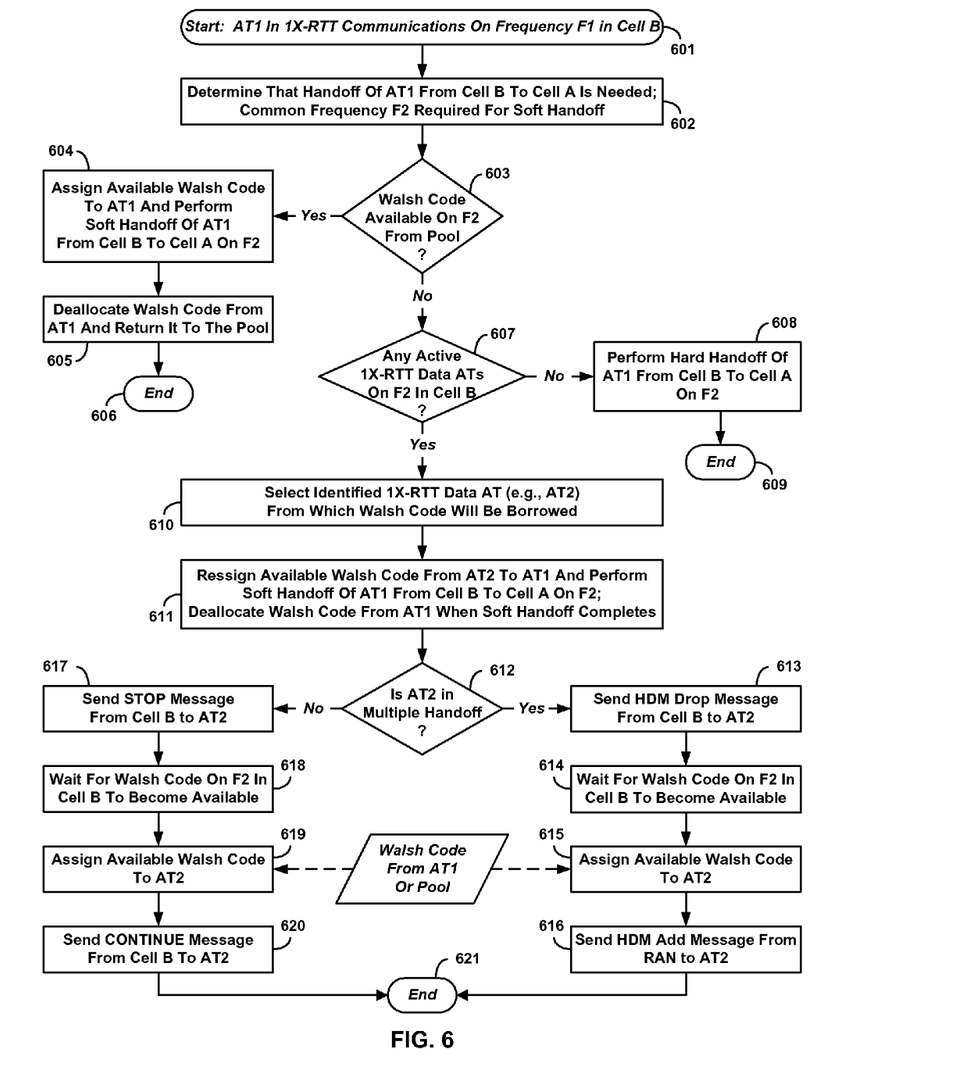
FIG. 6 is a flowchart depicting an example embodiment of optimized handoff for 1X-RTT communication.

FIG. 6 illustrates an embodiment of optimized handoff across a frequency border as applied to 1X-RTT communication (i.e., data communication under IS-2000). The process is largely the same as that for EV-DO, so the following discussion is somewhat abbreviated compared with the discussion of EV-DO above. The process begins at step 601, at which point access terminal AT1 is assumed to be already engaged in 1X-RTT data communications on carrier frequency F1 in a first coverage area, again designated as "cell B." At step 602, a determination is made that AT1 needs to be handed off to cell A on common carrier frequency F2. Again, AT1 will first have to be handed down to F2 in cell B in order for a soft handoff to be possible.

At step 603, the source base station (or some other RAN element) first attempts to find an unassigned Walsh code (e.g., from a pool), which, if found is assigned to AT1 at step 604 to facilitate a soft handoff on F2 of AT1 from source cell B to target cell A (the hand-down may be considered as implicit in this step). At step 605, AT1 returns the Walsh code to cell B, thereby also releasing its connection on F2 to the source base station in cell B, and the process is complete (as indicated at step 606).

If all Walsh codes on F2 in cell B are already assigned to other ATs, then a determination is made at step 607 as to whether any of the other ATs are engaged in 1X-RTT data communications. Since 1X-RTT packet data communications only provides best effort service, the determination at step 607 is analogous to determining that one or more of the ATs with assigned Walsh codes on F2 are receiving best effort service. That is, IS-2000 supports both circuit voice (i.e., real-time) communication and 1X-RTT packet data communication, so only ATs engaged in 1X-RTT communications are considered for the purpose of borrowing a Walsh code. This is different from the EV-DO which supports both real-time and best effort packet data services. If none of the other ATs that are using all of the assigned Walsh codes on F2 in cell B are engaged in 1X-RTT communication, then a hard handoff of AT1 is carried out at step 608. The process then completes at step 609.

If there are ATs engaging in 1X-RTT communication on F2 in cell B that (branch labeled "Yes" from step 607), then one of them is selected from which a Walsh code will be borrowed. Again for illustration, the access terminal selected is designated AT2, as indicated in step 610. At step 611, the Walsh code assigned to AT2 is reassigned to AT1, thereby enabling AT1 to hand down from F1 to F2 in cell B. Once AT1 has a forward channel on F2 from the source base station in cell B (using the Walsh code reassigned from AT2), a soft handoff of AT1 from cell B to cell A is carried out on common carrier frequency F2. When the soft handoff is complete, AT1 returns the Walsh code to cell B, thereby also releasing its connection on F2 to the source base station in cell B.

Handling of communications with AT2 with, and following, reassignment of its Walsh code to AT1 is shown in steps 612-621. As with the EV-DO embodiment, some or all of these steps could in practice occur in parallel with the reassignment and/or handoff of step 611, and their depiction as logically following step 611 largely serves the purpose of separately illustrating the handling of AT2 in the time during which AT2's Walsh code is reassigned to AT1.

A determination is made as to whether AT2 is in multiple handoff mode is made at step 612. As with EV-DO, an AT is in multiple handoff mode if it has more than one sector (or other form of coverage area) in its active set. (As described above, under IS-2000, unlike under IS-856, an AT can receive forward-channel data from all of its active sectors concurrently.) If AT2 is in multiple handoff mode, the base station in cell B sends an HDM Drop message to AT2, as indicated at step 613. Any active 1X-RTT communication from cell B to AT2 will thereby be suspended and cell B will be removed from AT2's active set. At step 514, AT2 waits for a Walsh code to again become available on F2 in cell B. While waiting, AT2 may continue to detect a strong pilot signal from cell B, and consequently send requests on its reverse channel for cell B to be added to its active list. However, the RAN will deny (or ignore) those requests, since AT2's Walsh code in cell B was borrowed and reassigned to AT1. Note that AT2 may retain communications with its other active set members while it waits to reconnect with cell B.

At step 615, a Walsh code on F2 in cell B becomes available, either from AT1 upon completion of its handoff to cell A or from one or more of the other ATs in cell B that has in the interim relinquished a Walsh code on F2. Communication with AT2 on F2 in cell B then resumes, as indicated at step 616, where the RAN sends an HDM Add message to AT2. The process is then complete, as indicated at step 621.

If AT2 is determined at step 612 to not be in multiple handoff mode, the base station in cell B sends a Stop message to AT2, as indicated at step 617, thereby suspending 1X-RTT communication. At step 618, AT2 then waits for a Walsh code to again become available on F2 in cell B. Once a Walsh code on F2 in cell B becomes available, it is assigned to AT2 (step 619), and communication resumes upon a Continue message from the base station in cell B, as indicated at step 620. The process is now complete (step 621). Again, the Stop and Continue messages could involve new messages that are not currently defined within IS-2000, IS-856 or other CDMA protocols.

5. Conclusion

An exemplary embodiment of the present invention has been described above. Those skilled in the art will understand, however, that changes and modifications may be made to this embodiment without departing from the true scope and spirit of the invention, which is defined by the claims.

We claim:

1. In a wireless communication system that includes a plurality of coverage areas, and in which handoffs of access terminals between coverage areas are facilitated, at least in part, by identifiers assigned to the access terminals for communicating over air interfaces in the coverage areas, a method comprising:

determining that a handoff of a first access terminal communicating on a first channel band in a first coverage area to a second coverage area is necessary;

in response to determining that the handoff is necessary, determining that none of a plurality of identifiers for use in communicating on a second channel band within the first coverage area is available for facilitating the handoff;

determining that a second access terminal has been assigned a particular identifier for use by the second access terminal in communicating on the second channel band within the first coverage area from among the plurality of identifiers;

reallocating the particular identifier from the second access terminal to the first access terminal, thereby reassigning the particular identifier to the first access terminal for use by the first access terminal in communicating on the second channel band within the first coverage area; and performing the handoff of the first access terminal from the first coverage area to the second coverage area using the particular identifier to facilitate the handoff on the second channel band.

2. The method of claim 1, wherein determining that the handoff of the first access terminal from the first coverage area to the second coverage area is necessary comprises determining that the handoff requires the first access terminal to switch from the first channel band having a first value of a particular channel-band attribute to the second channel band having a second value of the particular channel-band attribute.

3. The method of claim 2, wherein the particular channel-band attribute is carrier frequency, the first value is a first frequency, and the second value is a second frequency.

4. The method of claim 2, wherein a first identifier, not from among the plurality of identifiers, has been assigned to the first access terminal for use in communicating on the first channel band in the first coverage area, and wherein determining that none of the plurality of identifiers is available for facilitating the handoff comprises determining that no other identifier is available to be assigned to the first access terminal for use in communicating on the second channel band in the first coverage area.

5. The method of claim 2, wherein determining that the second access terminal has been assigned the particular identifier from among the plurality of identifiers comprises:

determining that the particular identifier has been assigned to the second access terminal for use in communicating on the second channel band in the first coverage area; and determining that the second access terminal has been designated to receive service from the wireless communication system at a given service level.

6. The method of claim 5, wherein reallocating the particular identifier from the second access terminal to the first access terminal comprises suspending communications of the second access terminal on the second channel band in the first coverage area.

7. The method of claim 4, wherein the second coverage area supports communications with access terminals on at least the second channel band, and wherein performing the handoff of the first access terminal from the first coverage area to the second coverage area using the particular identifier to facilitate the handoff comprises:
   transferring communications of the first access terminal in the first coverage area from the first channel band to the second channel band using the reallocated particular identifier;
   handing off the first access terminal from the second channel band in first coverage area to the second channel band in the second coverage area; and
   after handing off, deallocating the particular identifier from the first access terminal, thereby making the particular identifier available for use on the second channel band in the first coverage area.

8. The method of claim 6, wherein performing the handoff of the first access terminal from the first coverage area to the second coverage area using the particular identifier to facilitate the handoff comprises:
   deallocating the particular identifier from the first access terminal upon completion of the handoff;
   reassigning to the second access terminal an available one of the plurality of identifiers, wherein available identifiers from among the plurality of identifiers include at least the particular identifier; and
   after reassigning, resuming communications of the second access terminal on the second channel band in the first coverage area.

9. The method of claim 7, wherein (i) the wireless communication system operates according to a CDMA family of protocols, (ii) the plurality of identifiers and the first identifier are selected from the group consisting of MAC IDs and Walsh codes, and (iii) the first channel band comprises a first carrier frequency and the second channel band comprises a common carrier frequency, and wherein:
   transferring communications of the first access terminal in the first coverage area from the first channel band to the second channel band comprises handing down the first access terminal from the first carrier frequency to the common carrier frequency;
   handing off the first access terminal from the second channel band in first coverage area to the second channel band in the second coverage area comprises performing a soft handoff of the first access terminal from the common carrier frequency in first coverage area to the common carrier frequency in the second coverage area; and
   deallocating the particular identifier from the first access terminal comprises ceasing communications of the first access terminal on the second channel band in the first coverage area.

10. The method of claim 8, wherein the wireless communication system operates according to a CDMA family of protocols, each identifier is a MAC ID, and wherein:
   suspending communications of the second access terminal on the second channel band in the first coverage area comprises sending a first control message to the second access terminal, the first control message being (i) a Close Connection message if the second access terminal has a plurality of coverage areas in its active set, or (ii) a Stop message if the second access terminal has only the first coverage area in its active set; and
   resuming communications of the second access terminal on the second channel band in the first coverage area comprises sending to the second access terminal a second control message, the second control message being (i) an Traffic Channel Assignment message if the first control message was a Close Connection message, or (ii) a Continue message if the first control message was a Stop message.

11. The method of claim 8, wherein the wireless communication system operates according to a CDMA family of protocols, each identifier is a Walsh code, and wherein:
   suspending communications of the second access terminal on the second channel band in the first coverage area comprises sending a first control message to the second access terminal, the first control message being (i) a Handoff Direction Message (HDM) instructing the second access terminal to drop the first coverage area from its active set if the second access terminal has a plurality of coverage areas in its active set, or (ii) a Stop message if the second access terminal has only the first coverage area in its active set; and
   resuming communications of the second access terminal on the second channel band in the first coverage area comprises sending to the second access terminal a second control message, the second control message being (i) an HDM instructing the second access terminal to add the first coverage area to its active set if the first control message was an HDM, or (ii) a Continue message if the first control message was a Stop message.

12. The method of claim 1 wherein (i) the wireless communication system operates according to a CDMA family of protocols, (ii) the first coverage area comprises a first base station and supports communications with access terminals on a first carrier frequency and on a common carrier frequency, (iii) the second coverage area comprises a second base station and supports communications with access terminals on at least the common carrier frequency, (iv) the first access terminal is communicating on the first carrier frequency in the first coverage area using a first identifier that is not from among the plurality of identifiers, and (v) the plurality of identifiers and the first identifier are selected from the group consisting of MAC IDs and Walsh codes, and wherein:
   determining that the handoff of the first access terminal from the first coverage area to the second coverage area is necessary comprises, at the first base station, determining that a handoff of the first access terminal across a frequency border between the first coverage area and the second coverage area is necessary;
   determining that none of the plurality of identifiers is available for facilitating the handoff comprises, at the first base station, determining that no other identifier is available to be assigned to the first access terminal for use in communicating on the common carrier frequency in the first coverage area;
   determining that the second access terminal has been assigned the particular identifier from among the plurality of identifiers comprises, at the first base station, determining the second access terminal is communicating on the common carrier frequency in the first coverage area using the particular identifier and that the second access terminal has been designated to receive best-effort service from the wireless communication system;

reallocating the particular identifier from the second access terminal to the first access terminal comprises, at the first base station, suspending communications of the second access terminal on the common carrier frequency in the first coverage area and reassigning the particular identifier to the first access terminal for communications on the common carrier frequency in the first coverage area; and performing the handoff of the first access terminal from the first coverage area to the second coverage area using the particular identifier to facilitate the handoff comprises:
at the first base station, handing down the first access terminal from the first carrier frequency to the common carrier frequency in the first coverage area;
on the common frequency carrier, performing a soft handoff of the first access terminal from the first base station to the second base station;
at the first base station, deallocating the particular identifier from the first access terminal upon completion of the soft handoff, thereby making the particular identifier available for use on the common carrier frequency in the first coverage area;
at the first base station, reassigning to the second access terminal an available one of the plurality of identifiers; and
upon command of the wireless communication system, resuming communications of the second access terminal on the common carrier frequency in the first coverage area.

13. In a wireless communication system that operates according to a CDMA family of protocols, includes a plurality of coverage areas, and in which handoffs of access terminals between coverage areas are facilitated, at least in part, by identifiers assigned to the access terminals for communicating over air interfaces in the coverage areas, a method comprising:
determining that a first access terminal using a first identifier for communicating on a first carrier frequency in a first coverage area needs to be handed off to a second coverage area that supports communications on at least a common carrier frequency;
reassigning a particular identifier from a second access terminal to the first access terminal, the particular identifier being for use in communicating on the common carrier frequency in the first coverage area;
handing down the first access terminal from the first carrier frequency in the first coverage area to the common carrier frequency in the first coverage area;
on the common carrier frequency, performing a soft handoff of the first access terminal from the first coverage area to the second coverage area;
deallocating the particular identifier from the first access terminal upon completion of the soft handoff; and
assigning to the second access terminal one identifier selected from the group consisting of the deallocated particular identifier and a second identifier for communicating on the common carrier frequency in the first coverage area.

14. The method of claim 13, wherein reassigning the particular identifier from the second access terminal to the first access terminal comprises:
determining that no other identifier is available for communicating on the common carrier frequency in the first coverage area;
determining that the second access terminal has been designated to receive best-effort service from the wireless communication system; and
suspending communications of the second access terminal on the common carrier frequency in the first coverage area.

15. The method of claim 14, wherein assigning to the second access terminal one identifier selected from the group consisting of the deallocated particular identifier and a second identifier for communicating on the common carrier frequency in the first coverage area comprises:
selecting for assignment to the second access terminal one identifier selected from the group consisting of the deallocated particular identifier and a second identifier, the selection being based, at least in part, on which of the deallocated particular identifier and a second identifier becomes available first; and
resuming communications of the second access terminal on the common carrier frequency in the first coverage area.

16. The method of claim 13, wherein each identifier is a MAC ID, and wherein:
reassigning the particular identifier from the second access terminal to the first access terminal comprises suspending communications of the second access terminal on the common carrier frequency in the first coverage area by sending to the second access terminal a first control message, the first control message being (i) a Close Connection message if the second access terminal has a plurality of coverage areas in its active set, or (ii) a Stop message if the second access terminal has only the first coverage area in its active set; and
assigning to the second access terminal one of the deallocated particular identifier and the second identifier for communicating on the common carrier frequency in the first coverage area comprises resuming communications of the second access terminal on the common carrier frequency in the first coverage area by sending to the second access terminal (i) an Traffic Channel Assignment message if the first control message was a Close Connection message, or (ii) a Continue message if the first control message was a Stop connection message.

17. The method of claim 13, wherein each identifier is a Walsh code, and wherein:
reassigning the particular identifier from the second access terminal to the first access terminal comprises suspending communications of the second access terminal on the common carrier frequency in the first coverage area by sending to the second access terminal a first control message, the first control message being (i) a Handoff Direction Message (HDM) instructing the second access terminal to drop the first coverage area from its active set if the second access terminal has a plurality of coverage areas in its active set, or (ii) a Stop message if the second access terminal has only the first coverage area in its active set; and
assigning to the second access terminal one of the deallocated particular identifier and the second identifier for communicating on the common carrier frequency in the first coverage area comprises resuming communications of the second access terminal on the second channel band in the first coverage area by sending to the second access terminal (i) an HDM instructing the second access terminal to add the first coverage area to its active set if the first control message was an HDM, or (ii) a Continue message if the first control message was a Stop message.

18. In a wireless communication system that operates according to a CDMA family of protocols, includes a plurality of coverage areas, and in which handoffs of access terminals between coverage areas are facilitated, at least in part, by identifiers assigned to the access terminals for communicating over air interfaces in the coverage areas, an improvement comprising:

means for determining that a first access terminal using a first identifier for communicating on a first carrier frequency in a first coverage area needs to be handed off to a second coverage area that supports communications on at least a common carrier frequency;

means for reassigning a particular identifier from a second access terminal to the first access terminal, wherein the particular identifier is for use in communicating on the common carrier frequency in the first coverage area;

means for handing down the first access terminal from the first carrier frequency in the first coverage area to the common carrier frequency in the first coverage area;

means for performing a soft handoff on the common carrier frequency of the first access terminal from the first coverage area to the second coverage area;

means for deallocating the particular identifier from the first access terminal upon completion of the soft handoff; and means for assigning to the second access terminal one identifier selected from the group consisting of the deallocated particular identifier and a second identifier for communicating on the common carrier frequency in the first coverage area.

19. The improvement of claim 18, wherein means for reassigning the particular identifier from the second access terminal to the first access terminal comprise:

means for determining that no other identifier is available for communicating on the common carrier frequency in the first coverage area;

means for determining that the second access terminal has been designated to receive best-effort service from the wireless communication system; and means for suspending communications of the second access terminal on the common carrier frequency in the first coverage area.

20. The improvement of claim 19, wherein means for assigning to the second access terminal one identifier selected from the group consisting of the deallocated particular identifier and a second identifier for communicating on the common carrier frequency in the first coverage area comprise:

means for selecting for assignment to the second access terminal one identifier selected from the group consisting of the deallocated particular identifier and a second identifier, wherein the selection is based, at least in part, on which of the deallocated particular identifier and a second identifier becomes available first; and means for resuming communications of the second access terminal on the common carrier frequency in the first coverage area.

21. The improvement of claim 18, wherein each identifier is a MAC ID, and wherein:

means for reassigning the particular identifier from the second access terminal to the first access terminal comprise means for suspending communications of the second access terminal on the common carrier frequency in the first coverage area by sending to the second access terminal a first control message, wherein the first control message is (i) a Close Connection message if the second access terminal has a plurality of coverage areas in its active set, or (ii) a Stop message if the second access terminal has only the first coverage area in its active set; and means for assigning to the second access terminal one of the deallocated particular identifier and the second identifier for communicating on the common carrier frequency in the first coverage area comprise means for resuming communications of the second access terminal on the common carrier frequency in the first coverage area by sending to the second access terminal (i) an Traffic Channel Assignment message if the first control message was a Close Connection message or (ii) a Continue message if the first control message was a Stop connection message.

22. The improvement of claim 18, wherein each identifier is a Walsh code, and wherein:

means for reassigning the particular identifier from the second access terminal to the first access terminal comprise means for suspending communications of the second access terminal on the common carrier frequency in the first coverage area by sending to the second access terminal a first control message, wherein the first control message is (i) a Handoff Direction Message (HDM) instructing the second access terminal to drop the first coverage area from its active set if the second access terminal has a plurality of coverage areas in its active set, or (ii) a Stop message if the second access terminal has only the first coverage area in its active set; and means for assigning to the second access terminal one of the deallocated particular identifier and the second identifier for communicating on the common carrier frequency in the first coverage area comprise means for resuming communications of the second access terminal on the second channel band in the first coverage area by sending to the second access terminal (i) an HDM instructing the second access terminal to add the first coverage area to its active set if the first control message was an HDM, or (ii) a Continue message if the first control message was a Stop message.

* * * * *